United States Patent
Mohan (10) Patent No.: US 9,930,031 B2
(45) Date of Patent: Mar. 27, 2018

(54) MULTI-FACTOR USER AUTHENTICATION BASED ON USER CREDENTIALS AND ENTRY TIMING

(71) Applicant: CA, INC., New York, NY (US)

(72) Inventor: Badrinath Mohan, Bangalore (IN)

(73) Assignee: CA, Inc., New York, NY (US)

( * ) Notice: Subject to any disclaimer, the term of this patent is extended or adjusted under 35 U.S.C. 154(b) by 145 days.

(21) Appl. No.: 14/971,591

(22) Filed: Dec. 16, 2015

(65) Prior Publication Data
US 2017/0180345 A1    Jun. 22, 2017

(51) Int. Cl.
*H04L 29/06*    (2006.01)
(52) U.S. Cl.
CPC ................... *H04L 63/083* (2013.01)
(58) Field of Classification Search
None
See application file for complete search history.

(56) References Cited

U.S. PATENT DOCUMENTS

| | | | | |
|---|---|---|---|---|
| 2001/0036855 A1* | 11/2001 | DeFrees-Parrott | ..... | G07F 17/34 463/17 |
| 2005/0198501 A1* | 9/2005 | Andreev | ............. | H04L 63/0815 713/168 |
| 2007/0022299 A1* | 1/2007 | Yoshimura | .............. | G06F 21/31 713/183 |
| 2013/0005263 A1* | 1/2013 | Sakata | ................ | H04W 76/027 455/41.2 |
| 2016/0350729 A1* | 12/2016 | Lee | .................... | G06Q 30/0601 |

* cited by examiner

*Primary Examiner* — David Le
(74) *Attorney, Agent, or Firm* — Sage Patent Group (57) ABSTRACT

A method of performing operations on an account server processor includes receiving authentication query messaging through a network interface from a user terminal. The authentication query messaging contains an account identifier and a credential string of characters. An elapsed time associated with the user entering characters of the credential string through a user interface of the user terminal is determined responsive to the authentication query messaging. A combination of the account identifier, the credential string, and the elapsed time is authenticated to generate an authentication result. The operations further include selectively communicating through the network interface toward the user terminal based on the authentication result, information that is fetched from a memory of an accounts database using the account identifier. Related account server processors and methods by user terminals are disclosed.

26 Claims, 6 Drawing Sheets

| PIN | Sequence Spacing Times |
|---|---|
| 2 | 2.0 |
| 5 | 2.75 |
| 0 | 0.5 |
| 8 | 1.5 |

*FIG. 3a*

Authentication Query Message 2,2.0,5,2.75,0,0.5,8,1.5

Authentication Query Message
Colorado@1,3.75

FIG. 5

| C | 3.5 |
|---|---|
| o | <0.1 |
| l | 0.5 |
| o | <0.1 |
| r | <0.1 |
| a | <0.1 |
| d | <0.1 |
| o | 0.25 |
| @ | 3.0 |
| 1 | 0.75 |

FIG. 6a

Authentication Query Message
C,3.5,o,0,l,0.5,o,0.,r,0,a,0,d,0,o,0.25,@,3.0,1,0.75

MULTI-FACTOR USER AUTHENTICATION BASED ON USER CREDENTIALS AND ENTRY TIMING

BACKGROUND

The present disclosure relates to electronic devices and, more particularly, to user interfaces for portable electronic devices.

Passwords remain the dominant means of authentication in computer systems because of their simplicity, legacy deployment and ease of revocation. Unfortunately, common approaches to entering passwords by way of keyboard, mouse, touch screen or any traditional input device, are frequently vulnerable to attacks such as shoulder surfing and password snooping.

Shoulder-surfing is an attack on password authentication that has traditionally been hard to defeat. It can be done remotely using binoculars and cameras, using keyboard acoustics, or embedded keystroke tracking software. Access to the user's password simply by observing the user while he or she is entering a password undermines the effort put into encrypting passwords and protocols for authenticating the user securely. To some extent, the human actions when inputting the password are the weakest link in the chain.

SUMMARY

Some embodiments of the present disclosure are directed to a method of performing operations on an account server processor. The operations include receiving authentication query messaging through a network interface from a user terminal. The authentication query messaging contains an account identifier and a credential string of characters. An elapsed time associated with the user entering characters of the credential string through a user interface of the user terminal is determined responsive to the authentication query messaging. A combination of the account identifier, the credential string, and the elapsed time is authenticated to generate an authentication result. The operations further include selectively communicating through the network interface toward the user terminal based on the authentication result, information that is fetched from a memory of an accounts database using the account identifier.

Some other embodiments of the present disclosure are directed to a method of performing operations on a user terminal processor. The operations include receiving characters of a credential string entered by a user through a user interface of a user terminal. An elapsed time associated with the user entering the characters of the credential string is determined. A combination of the credential string and the elapsed time is authenticated to generate an authentication result. Access by the user to information stored in a memory is controlled responsive to the authentication result.

Some other embodiments of the present disclosure are directed to a user terminal that includes a user interface, a processor, and a memory coupled to the processor and storing computer readable program code that when executed by the processor causes the processor to perform operations. The operations include receiving characters of a credential string entered by a user through the a user interface, determining an elapsed time associated with the user entering the characters of the credential string, authenticating a combination of the credential string and the elapsed time to generate an authentication result, and controlling access by the user to information stored in the memory responsive to the authentication result.

Other methods, account servers, and user terminals according to embodiments of the inventive subject matter will be or become apparent to one with skill in the art upon review of the following drawings and detailed description. It is intended that all such additional methods, account servers, and user terminals be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, password entry remains a weakness in efforts to improve user authentication effectiveness. Various embodiments of the present disclosure are directed to providing more secure authentication of user credentials, such as passwords, entered by a user through a user terminal. In some embodiments, multi-factor authentication is provided by authentication of a combination of a credential string entered by a user and an elapsed time measured between timing events associated with the user entering at least one character of the credential string.

A user authentication node authenticates a user responsive to authentication of a combination of the credential string and an elapsed time for the user to enter the entire credential string or to enter a character at one or more defined locations in the credential string. The user authentication node may determine that the user is authentic only when the credential string matches a registered credential string that has been associated with a user's account and the elapsed time matches (e.g., within a threshold range) of a threshold elapsed time that has been associated with the user's account. The threshold elapsed time may be defined by a user, such as during a registration process. The threshold elapsed time may alternatively be learned over time by the user authentication node measuring elapsed times between defined timing events during each of a plurality of repetitions of a user entering one or more characters of a credential string, and mathematically combining the measured elapsed times to generate the threshold elapsed time. The elapsed time thereby forms an authentication factor that is indicative of the authenticity of the user entering the credential string.

The threshold range may be defined by a user, such as during a registration process. The threshold range may be learned over time by the user authentication node measuring variation in the elapsed times between a plurality of repetitions of a user entering one or more characters of a credential string to cause occurrence of the defined timing events between which the elapsed time is measured.

For example, an authentic user who is entering the credential string after perhaps months of repetitive practice with such entry will have a typical elapsed time between entry of a first character to a last character forming the credential string that is different than an unauthentic user who is typing the credential string for the first time and/or a machine that is attempting a rapid brute force trial-and-error repetitive attack. The user authentication node can therefore accurately authenticate a user because of the timing differences observed between the authentic and unauthentic users.

Figure 1:
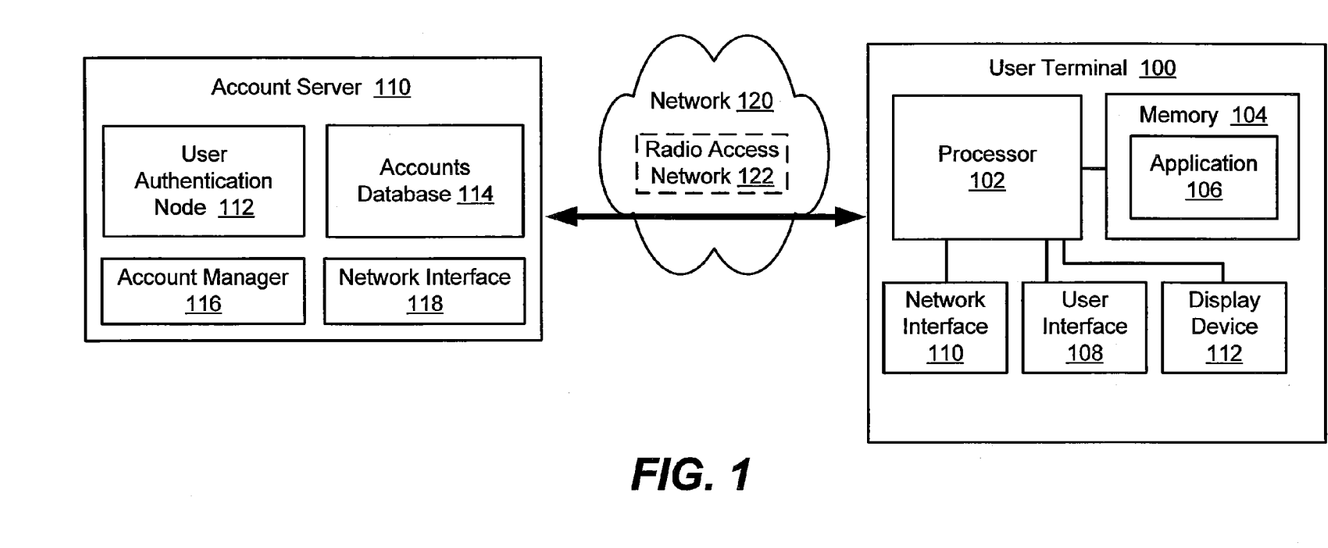
FIG. 1 is a block diagram of a user terminal and an account server that can authenticate a user according to some embodiments of the present disclosure.

These and other embodiments are described in further detail below. FIG. 1 is a block diagram of a user terminal 100 that communicates with an account server 110 to authenticate credentials entered by a user via the user terminal 100 according to some embodiments of the present disclosure. Although some embodiments are disclosed in the context of authentication being performed by the account server 110 configured as a user authentication node, in some other embodiments the user terminal 100 is configured as the user authentication node to independently authenticate the user or authenticate the user using a combination of credentials received from the user and account information received from the account server 110.

Referring to FIG. 1, the account server 110 communicates with the user terminal 100 through a data network 120 that may include wired (e.g., private or public wide area network (e.g., Internet)) and/or wireless network elements. For example, the data network 120 may include a radio access network 122 that communicates with the account server 110 and/or the user terminal 100 using one or more wireless communication protocols, such as WLAN, WiMax, LTE or other cellular, etc. The user terminal 100 may be any electronic device that can communicate with the account server 110, such as a smart phone, tablet computer, laptop computer, desktop computer, gaming console, etc.

The illustrated user terminal 100 includes a processor 102, a memory 104, a user interface 108, a network interface 110, and a display device 112. The network interface 110 may include a radio access network transceiver and/or a wired network interface (e.g., Ethernet interface). The user interface 108 may include a keyboard, touch screen input interface, speaker, and/or microphone. The processor 102 may include one or more data processing circuits, such as a general purpose and/or special purpose processor (e.g., microprocessor and/or digital signal processor) that may be collocated or distributed across one or more networks. The processor 102 is configured to execute computer program code 106 in the memory 104, described below as a non-transitory computer readable medium, to perform at least some of the operations described herein as being performed by a user terminal.

The account server 110 may include an accounts database 114, a user authentication node 112, an account manager 116, and a network interface 118. The accounts database 114 is a data repository that stores user credentials, such as user account identifiers and corresponding passwords, in data structures with logical associations to account identifiers. The user authentication node 112 operates to authenticate an account identifier and credentials received in authentication query messaging from the user terminal 100. When a user is properly authenticated by the user authentication node 112, the account manager 116 allows the user terminal 100 to access information (e.g., user data, media content, etc.) residing in the accounts database 114 associated with the account identifier or otherwise made accessible to authenticated users.

Figure 7:
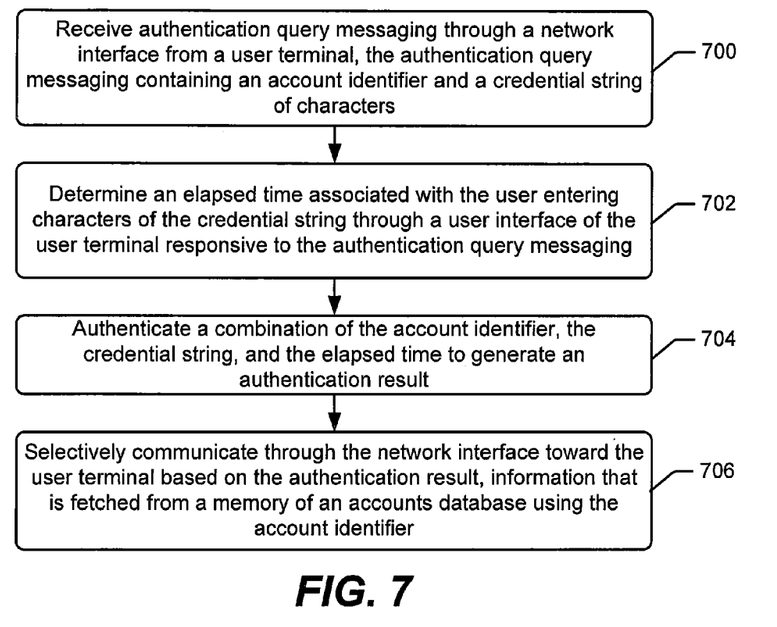
FIGS. 7-9 are flowcharts of operations that may be performed by an account server processor according to some embodiments of the present disclosure.

FIG. 7 is a flowchart of operations that may be performed by a processor of the account server 110, such within the user authentication node 112, according to some embodiments of the present disclosure. Referring to FIG. 7, the operations include receiving (block 700) authentication query messaging through the network interface 118 from the user terminal 100. The authentication query messaging contains an account identifier and a credential string of characters, and may be formed by one or more separate messages. An elapsed time associated with the user entering characters of the credential string through the user interface 108 of the user terminal 100 is determined (block 702) responsive to the authentication query messaging. The operations authenticate (block 704) a combination of the account identifier, the credential string, and the elapsed time to generate an authentication result. The operations selectively communicate (block 706) information, which is fetched from a memory of an accounts database 114 using the account identifier, through the network interface 118 toward the user terminal 100 based on the authentication result.

In this manner, the elapsed time associated with the user entering one or more characters of the credential string is used as a secondary factor for authenticating the user's credentials. The elapsed time may correspond to any pair of timing events, including one or more of: 1) the elapsed time between when a prompt is displayed and the user enters a first character of a credential string; 2) the elapsed time between when a prompt is displayed and the user enters an n'th character of a credential string; and 3) the elapsed time between when a user enters an i'th character and when the user enters an n'th character of the credential string.

In one embodiment, the user is authenticated responsive to authentication of a combination of the credential string and an elapsed time for the user to enter a character at a defined location (e.g., a first character, an n'th character, etc.) in the credential string. The user authentication node may determine that the user is authentic only when the credential string matches a registered credential string associated with a user's account and the elapsed time matches (e.g., within a threshold range) of a threshold elapsed time defined for that particular location in the credential string. The user authentication node may authenticate a user based on elapsed time between when a prompt is displayed to a user to enter the credential string and when a first character of the credential string is entered. The user may have registered a threshold time of 2 seconds, and the user authentication node can then determine that a user is authentic only if the first character is entered within a threshold range (e.g., plus or minus about 2 milliseconds or other defined time) of 2 seconds following display of the prompt.

In another embodiment, the user is authenticated responsive to authentication of a combination of the credential string and an elapsed time for the user to enter characters at two different defined locations in the credential string. The user authentication node may determine that the user is authentic only when the credential string matches a registered credential string associated with a user's account and the elapsed time matches (e.g., within a threshold range) of a threshold elapsed time defined for between character entry for those locations in the credential string. The user authentication node may determine whether the user is authentic based on elapsed time between when a first character and a fourth character of the credential string which has more than four characters. The user may have registered a threshold time of 4 seconds, and the user authentication node can then determine that a user is authentic only if the fourth character is entered within a threshold range (e.g., plus or minus about 5 milliseconds or other defined time) of 4 seconds following entry of the first character. Alternatively, the threshold time may be learned over time by the user authentication node by observing typical timing between the entry of the first and then fourth characters.

Figure 2:
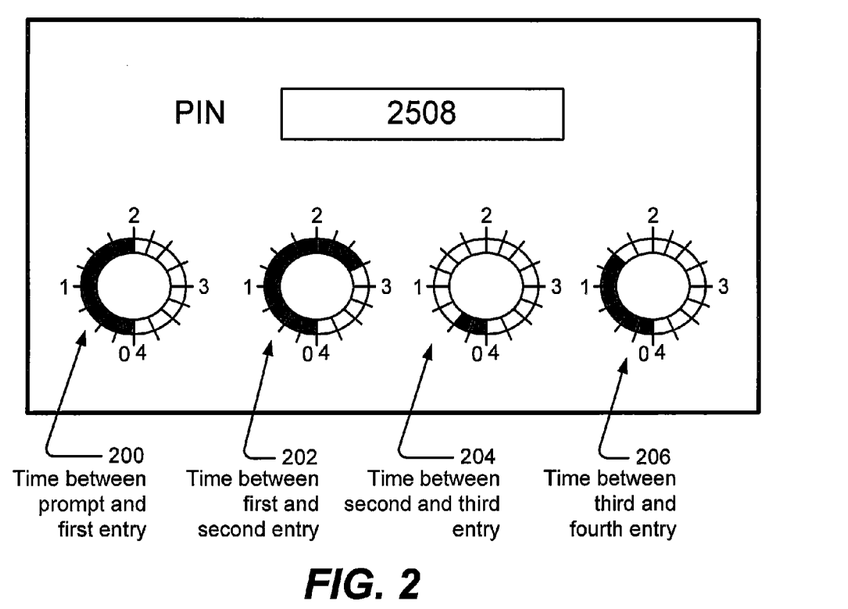
FIG. 2 illustrates a graphical screen that can be displayed on a display device of a user terminal during entry of a user's personal identification number or other credential string, in accordance with some embodiments of the present disclosure.

The user may be provided with a visual indication of the elapsed time associated with the user entering characters of the credential string, so that the user can control timing when the user enters one or more of the characters to cause occurrence of an elapsed time that corresponds to a registered elapsed time (e.g., within a threshold range of a registered elapsed time) which is needed for proper authentication of the user. FIG. 2 illustrates a graphical screen that can be displayed on a display device of the user terminal 100 during entry of a user's personal identification number or other credential string, in accordance with some embodiments of the present disclosure.

Referring to FIG. 2, the user terminal 100 displays a prompt "PIN" on the display device 112 to request that the user enter a PIN for authentication to enable access to account information residing on the user terminal and/or on the account server 110 (e.g., in the accounts database 114), and/or to enable execution by the user terminal 100 of an application, a feature of an application, and/or information to be provided to an application. In accordance with some embodiments, the user terminal 100 displays the elapsed time from occurrence of a defined time event (e.g., displaying a prompt to the user, detecting user entry of a character at a defined location in the credential string).

In the embodiment shown in FIG. 2, the user terminal 100 displays a first sweeping arc indication 200 of elapsed time from when the "PIN" prompt is displayed. The first sweeping arc indication 200 freezes when a first character of the PIN is entered by the user through the user interface 108. The user terminal 100 then displays a second sweeping arc indication 202 of elapsed time from when the first character of the PIN was entered. The second sweeping arc indication 202 freezes when a second character of the PIN is entered by the user. The user terminal 100 then displays a third sweeping arc indication 204 of elapsed time from when the second character of the PIN was entered. The third sweeping arc indication 204 freezes when a third character of the PIN is entered by the user. The user terminal 100 then displays a fourth sweeping arc indication 206 of elapsed time from when the third character of the PIN was entered. The fourth sweeping arc indication 206 freezes when a fourth character of the PIN is entered by the user. Although separate sweeping arc indications 200-206 have been illustrated, a single sweeping arc indication or any other numeric and/or animated graphical indication of elapsed time may instead be displayed. The elapsed times illustrated by when the sweeping arc indications 200-206 separate freeze form a secondary factor number string that is used to authenticate the user.

In the non-limiting embodiment of FIG. 2, the user sequentially typed a PIN string "2508" while observing the displayed indications of elapsed times so that the user can precisely control timing of each character entry to cause the elapsed times to be within a defined threshold range of registered elapsed times defined for each of the respective locations in the credential string that are required to be sufficiently matched for authentication of the user by the user authentication node within the account server 110 and/or in the user terminal 100.

Figure 3A:
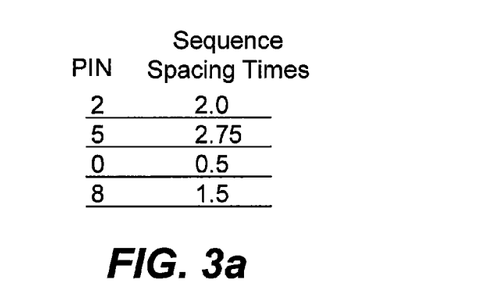
FIG. 3a illustrates an elapsed time that is measured between display of a prompt on the display device and user entry of a character at a first location in the PIN and elapsed times measured between user character entries at subsequent adjacent locations in the PIN.
Figure 3B:
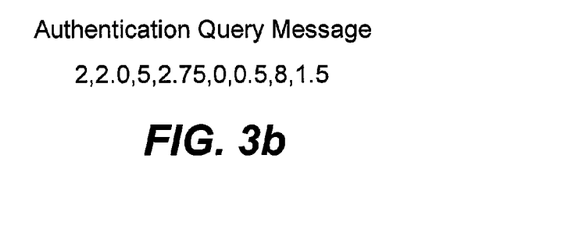
FIG. 3b illustrates an authentication query message that contains the PIN and the elapsed times illustrated in FIG. 3a, in accordance with some embodiments of the present disclosure.

In the example of FIGS. 2, 3a, and 3b, the user times entry of the first PIN character "2" to occur 2.0 seconds after display of the prompt "PIN", times entry of the second PIN character "5" to occur 2.75 seconds after entry of the first PIN character, times entry of the third PIN character "0" to occur 0.5 seconds after entry of the second PIN character, and then times entry of the fourth PIN character "8" to occur 1.5 seconds after entry of the third PIN character, as shown by the table of FIG. 3a and referred to as sequence spacing times. The user terminal 100 responsively generates authentication query messaging containing the entered PIN and the sequence spacing times measured by the user terminal 100. FIG. 3b illustrates an example authentication query message that contains the entire PIN string and the measured sequence spacing times. Accordingly, the PIN string and the corresponding sequence spacing times can be communicated from the user terminal 100 to the account server 110 through one or more messages, referred to as authentication query messaging.

Figure 8:
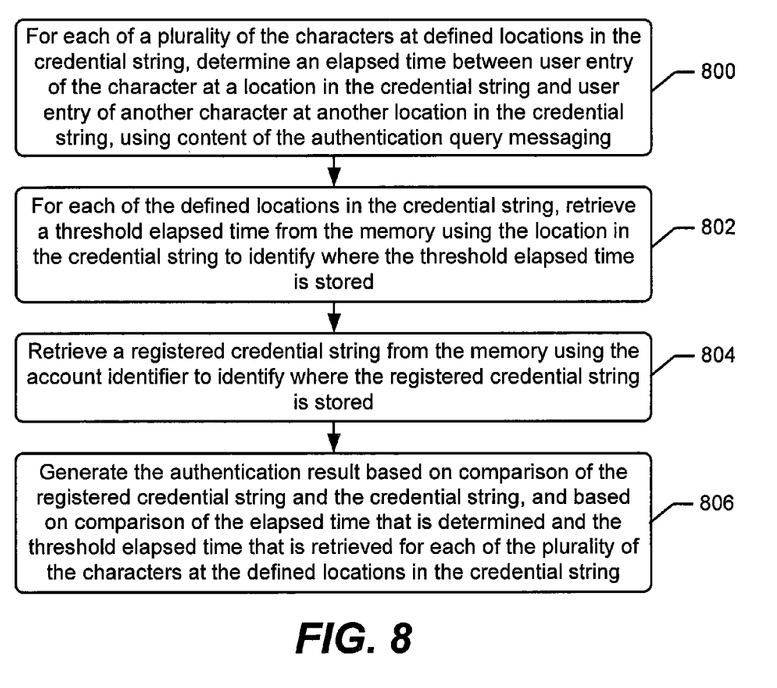

FIG. 8 is a flowchart of further operations that may be performed by a processor of the account server 110, such within the user authentication node 112, to determine an elapsed time associated with the user entering characters of the credential string through a user interface of the user terminal responsive to the authentication query messaging. Referring to FIG. 8, for each of a plurality of the characters at defined locations in the credential string, the user authentication node 112 determines (block 800) an elapsed time between user entry of the character at a location in the credential string and user entry of another character at another location in the credential string, using content of the authentication query messaging. For each of the defined locations in the credential string, the node 112 retrieves (block 802) a threshold elapsed time from the memory using the location in the credential string to identify where the threshold elapsed time is stored. The node 112 retrieves (block 804) a registered credential string from the memory (e.g., accounts database 114) using the account identifier to identify where the registered credential string is stored. The node 112 generates (block 806) the authentication result based on comparison of the registered credential string and the credential string, and based on comparison of the elapsed time that is determined and the threshold elapsed time that is retrieved for each of the plurality of the characters at the defined locations in the credential string.

The operations by the user authentication node 112 for receiving (block 700) authentication query messaging through the network interface from the user terminal, may include receiving a plurality of partial authentication responses each containing one of the characters of the credential string. The operations may then further include triggering a clock to accumulate the elapsed time from a defined time, repetitively communicating through the network interface toward the user terminal a timing message indicating the elapsed time for use in displaying on a display device of the user terminal, and resetting the elapsed time accumulated by the clock to the defined time responsive to each receipt of one of the plurality of partial authentication responses.

To retrieve (block 802) a threshold elapsed time from the memory using the location in the credential string to identify where the threshold elapsed time is stored, the user authentication node 112 may retrieve the threshold elapsed time from the memory using the account identifier and the location in the credential string to identify where the threshold elapsed time is stored.

To determine (block 800) an elapsed time, the user authentication node 112 may repeat the retrieval (block 802) of a threshold elapsed time and the generation (block 806) of the authentication result for at least all but one of the characters in the credential string. Thus, for example, when the credential string has a plural "n" character locations the user authentication node 112 may repeat the retrieval (block 802) and the generation (block 806) for some or all of the "n–1" locations in the credential string.

For one of the characters at a first location in the credential string, the user authentication node 112 may determine the elapsed time based on timing between communicating a prompt to enter the credential string for display on the user terminal to the user and an event indicating user entry of the character at the first location in the credential string.

In one embodiment, the user authentication node 112 determines the elapsed time based on content of the authentication query messaging received through the network interface from the user terminal.

The threshold elapsed time may be stored in the accounts database 114. The user authentication node 112 may therefore use the account identifier to retrieve the threshold elapsed time from the accounts database 114. The user may, for example, define the threshold elapsed time during a registration process and/or the threshold elapsed time may be machine learned over time based on measurements of the typical elapsed time for the user to enter one or more characters of the credential string relative to define timing events.

Figure 9:
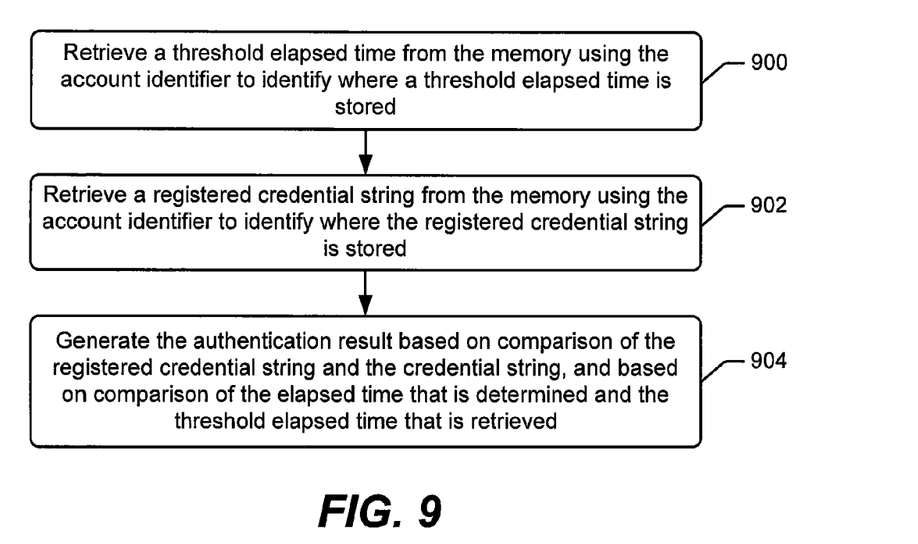

FIG. 9 is a flowchart of further operations that may be performed by a processor of the account server 110, such within the user authentication node 112, to authenticate a combination of the account identifier, the credential string, and the elapsed time to generate an authentication result. Referring to FIG. 9, a threshold elapsed time is retrieved (block 900) from the memory using the account identifier to identify where a threshold elapsed time is stored. A registered credential string is retrieved (block 902) from the memory using the account identifier to identify where the registered credential string is stored. The authentication result is then generated (block 904) based on comparison of the registered credential string and the credential string, and based on comparison of the elapsed time that is determined and the threshold elapsed time that is retrieved.

The user authentication node 112 may repeat the receiving, the determining, the authenticating, and the selectively communicating for each of a plurality of separate instances of the authentication query messaging from the user terminal. The threshold elapsed time is then generated based on the elapsed times from each of the repetitions of the determining, and the threshold elapsed time is stored in the memory in a data structure associated with the account identifier.

The user authentication node 112 may alternatively receive the threshold elapsed time in account registration messaging from the user terminal 100, and store the threshold elapsed time in the memory at a location identified using the account identifier.

Figure 4:
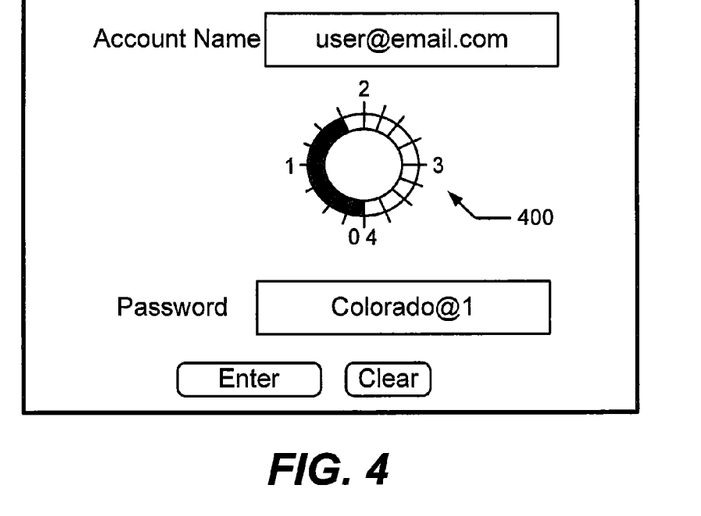
FIG. 4 illustrates a graphical screen that can be displayed on a display device of a user terminal during entry of an account name or other account identifier and/or during entry of a password or other user credential, in accordance with some embodiments of the present disclosure.
Figure 5:
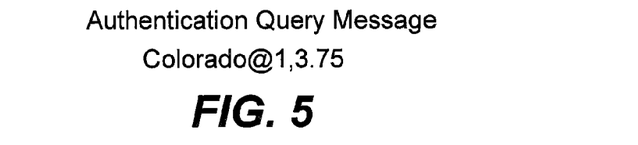
FIG. 5 illustrates an authentication query message that contains the password and an elapsed time associated with the user entering the password, in accordance with some embodiments of the present disclosure.

FIG. 2 illustrated some embodiments for how the user terminal 100 can be controlled to provide a user with a visual indication of the elapsed time associated with the user entering characters of the credential string, so that the user can control timing when the user enters one or more of the characters to cause occurrence of an elapsed time that corresponds to a registered elapsed time (e.g., within a threshold range of a registered elapsed time) which is needed for proper authentication of the user. FIG. 4 illustrates another graphical screen that can be displayed on a display device 112 of the user terminal 100 during entry of a user's personal identification number or other credential string, in accordance with some other embodiments of the present disclosure.

Referring to FIG. 4, the user authentication node 112 controls the user terminal 100 to display on the display device 112 a prompt to the user to enter an account name, which triggers the user to enter account information of "user@email.com." The user authentication node 112 also displays a prompt for the user to enter a credential string, e.g., password, which triggers the user to enter "Colorado@1." The elapsed time between two or more defined events associated with the user entering the account name and/or the password is measured and reported to the user authentication node 112. The user authentication node 112 then authenticates the user based on a combination of the account name, the password, and the elapsed time. In the example of FIG. 4, the user terminal 100 sends an authentication query message to the account server containing the password and the elapsed time measured between when the prompt to the user to enter the password was displayed and when the last character "1" of the password credential string was entered by the user. The user authentication node 112 may control the user terminal 100 to display a sweeping graphical indication 400 of the elapsed time following display of the prompt "password" so that the user can accurately time completion of the user's entry of the last character or another defined character location in the credential string to correspond to a threshold elapsed time that has been earlier associated in a data structure as being associated with the user's account name.

Figure 6A:
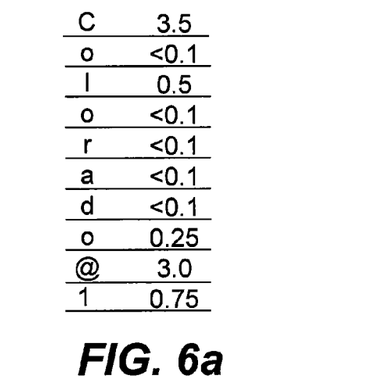
FIG. 6a illustrates an elapsed time that is measured between display of a prompt on the display device and user entry of a character at a first location in the password and elapsed times measured between user character entries subsequent adjacent locations in the password.
Figure 6B:
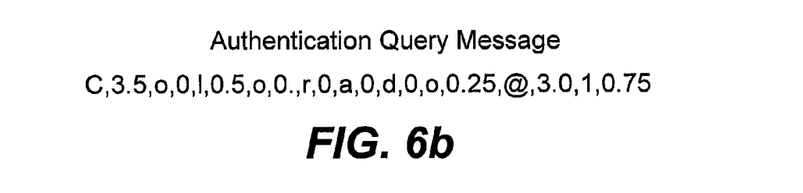
FIG. 6b illustrates an authentication query message that contains information identifying the password and the elapsed times illustrated in FIG. 6a, in accordance with some embodiments of the present disclosure.

In the particular example of FIG. 6a, the elapsed time between display of he password prompt and the user's entry of the first character "C" is 3.5 seconds, between the first and second characters is less than 0.1 seconds, between the second and third characters is 0.5 seconds, between the third and fourth characters is less than 0.1 seconds, between the fourth and fifth characters is less than 0.1 seconds, between the fifth and sixth characters is less than 0.1 seconds, between the sixth and seventh characters is less than 0.1 seconds, between the seventh and eighth characters is 0.25 seconds, between the eighth and ninth characters is 3.0 seconds, and between the ninth and tenth characters is 0.75 seconds. The user terminal 100 can accordingly communicate the authentication query message containing the password and the sequence of elapsed times to the user authentication node 112, which may be formatted according to the embodiment shown in FIG. 6b. The account name may be communicated in the same or different authentication query message. The user authentication node 112 can responsively authenticate the user based on the password matching a registered password stored in a data structure in the accounts database 114 associated with the account name entered by the user, and based on the sequence of elapsed times for each of the reported locations in the password matching within a define range a threshold elapsed time for that location stored in the data structure in the accounts database 114 associated with the account name entered by the user. As explained above, the threshold elapsed times for the various locations in the password may be defined by a user during a registration process and/or may be determined based on repetitive observations of typical timing as the user enters the password.

Figure 10:
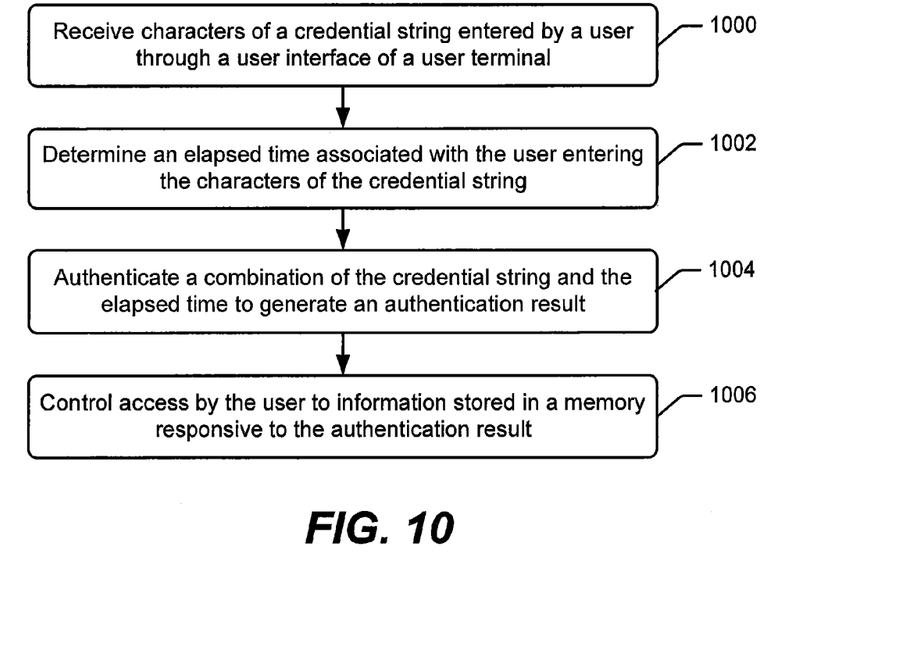
FIGS. 10-11 are flowcharts of operations that may be performed by a user terminal processor according to some embodiments of the present disclosure.

Referring to FIG. 10, the user terminal receives (block 1000) characters of a credential string entered by a user through a user interface 108 of a user terminal 100. An elapsed time associated with the user entering the characters of the credential string is determined (block 1002). A combination of the credential string and the elapsed time is authenticated (block 1004) to generate an authentication result, and access by the user to information stored in a memory is controlled (block 1006) responsive to the authentication result. The information may be stored within a memory 104 of the user terminal 100 and/or within the account server 110, such as within the accounts database 114 stored within a data structure associated with an account identifier for the user and/or the user terminal 100.

Figure 11:
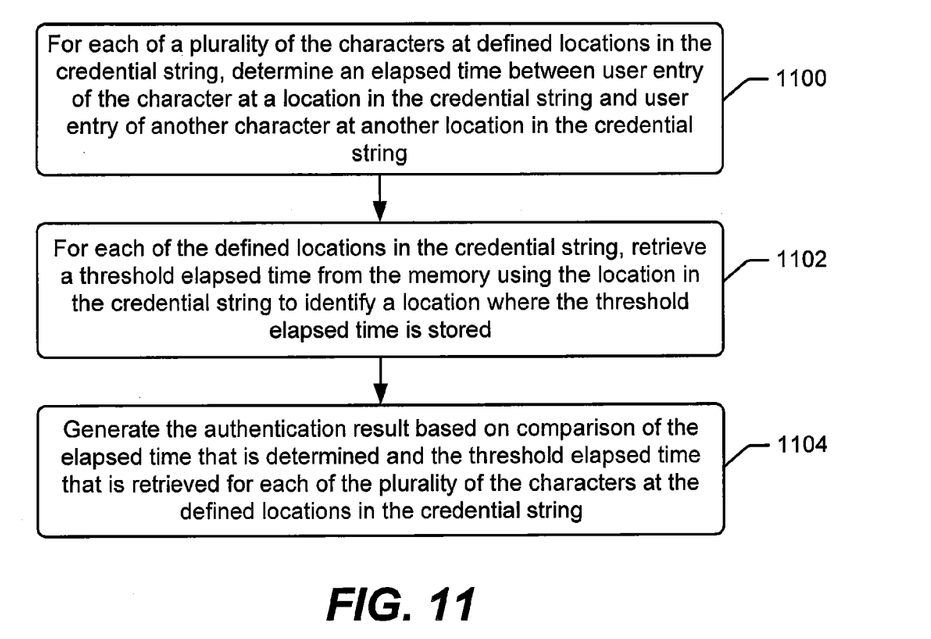

FIG. 11 illustrates a flowchart of further operations that may be performed by the user terminal 100 to determine the elapsed time associated with the user entering the characters of the credential in accordance with some further embodiments. Referring to FIG. 11, the operations include, for each of a plurality of the characters at defined locations in the credential string, determining (block 1100) an elapsed time between user entry of the character at a location in the credential string and user entry of another character at another location in the credential string. The operations for authenticating a combination of the credential string and the elapsed time to generate an authentication result, includes, for each of the defined locations in the credential string, retrieving (block 1102) a threshold elapsed time from the memory using the location in the credential string to identify a location where the threshold elapsed time is stored. The authentication result is then generated (block 1104) based on comparison of the elapsed time that is determined and the threshold elapsed time that is retrieved for each of the plurality of the characters at the defined locations in the credential string.

The operations by the user terminal 100 can further include triggering a clock to accumulate the elapsed time from a defined time. For each of a plurality of the characters at defined locations in the credential string, the user terminal 100 displays on a display device 112 an indication of the elapsed time between user entry of the character at the location in the credential string and user entry of the another character at the another location in the credential string, and resets the elapsed time accumulated by the clock to the defined time responsive to user entry of the another character.

The operations by the user terminal 100 can further include receiving an account identifier entered by the user through the user interface 108 of the user terminal 110. Authentication of a combination of the credential string and the elapsed time to generate an authentication result, can then include retrieving a registered credential string from the memory using the account identifier to identify a location where the registered credential string is stored, and generating the authentication result based on comparison of the registered credential string and the credential string, and based on comparison of the elapsed time that is determined and the threshold elapsed time that is retrieved for each of the plurality of the characters at the defined locations in the credential string.

To determine an elapsed time associated with the user entering the characters of the credential string, the user terminal 100 may operation, for one of the characters at a defined location in the credential string, to determine the elapsed time based on timing between displaying on a display device a prompt for the user to enter the credential string and an event indicating user entry of the character at the defined location in the credential string.

The user terminal 100 may further operate to display on the display device 112 an indication of timing since the prompt was displayed on the display device 110.

The user terminal 100 may further operate to receive an account identifier entered by the user through the user interface 108. Authentication of a combination of the credential string and the elapsed time to generate an authentication result can then include retrieving a threshold elapsed time from the memory using the account identifier to identify a location where the threshold elapsed time is stored, and generating the authentication result based on comparison of the elapsed time and the threshold elapsed time.

To authenticate a combination of the credential string and the elapsed time to generate an authentication result, the user terminal 100 may receive an account identifier entered by the user through the user interface of the user terminal, communicate an authentication query message containing the account identifier through a network interface toward to an account server, receive an authentication response message containing a threshold elapsed time through the network interface from the account server, and generate the authentication result based on comparison of the elapsed time and the threshold elapsed time.

Alternatively or additionally, the user terminal 100 may authenticate a combination of the credential string and the elapsed time to generate an authentication result, by operations that include receiving an account identifier entered by the user through the user interface of the user terminal, communicating an authentication query message containing the account identifier and the elapsed time through a network interface toward to an account server, and receiving an authentication response message containing the authentication result through the network interface from the account server.

Figure 12:
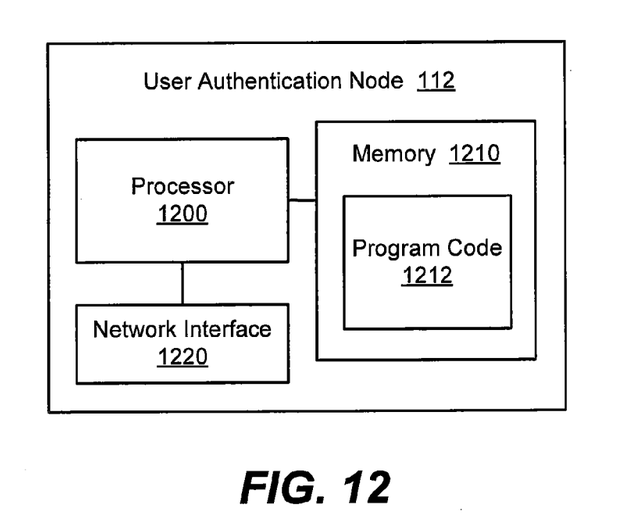
FIG. 12 is a block diagram of a user authentication node configured according to some embodiments of the present disclosure.

FIG. 12 illustrates a block diagram of a user authentication node 112 that is configured according to some embodiments. Referring to FIG. 12, the user authentication node 112 includes a processor. 1200, a memory 1210, and a network interface 1220. The processor 1200 may include one or more data processing circuits, such as a general purpose and/or special purpose processor (e.g., microprocessor and/or digital signal processor) that may be collocated or distributed across one or more networks. The processor 1200 is configured to execute computer program code 1212 in the memory 1210, described below as a non-transitory computer readable medium, to perform at least some of the operations described herein as being performed by a user authentication node.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
    performing operations as follows on an account server processor:
        receiving authentication query messaging through a network interface from a user terminal, the authentication query messaging containing an account identifier and a credential string of characters;
        for each of a plurality of the characters at defined locations in the credential string, determining an elapsed time between user entry of the character at a location in the credential string and user entry of another character at another location in the credential string, using content of the authentication query messaging;
        for each of the defined locations in the credential string, retrieving a threshold elapsed time from the memory using the location in the credential string to identify where the threshold elapsed time is stored;
        retrieving a registered credential string from the memory using the account identifier to identify where the registered credential string is stored;
        generating an authentication result based on comparison of the registered credential string and the credential string, and based on comparison of the elapsed time that is determined and the threshold elapsed time that is retrieved for each of the plurality of the characters at the defined locations in the credential string; and
        selectively communicating through the network interface toward the user terminal based on the authentication result, information that is fetched from a memory of an accounts database using the account identifier.

2. The method of claim 1, wherein:
the threshold elapsed time for each of the defined locations in the credential string comprises a threshold elapsed time range.

3. The method of claim 1, wherein the receiving authentication query messaging through the network interface from the user terminal, comprises:
    receiving a plurality of partial authentication responses each containing one of the characters of the credential string, and
    the operations further comprising:
        triggering a clock to accumulate the elapsed time from a defined time;
        repetitively communicating through the network interface toward the user terminal a timing message indicating the elapsed time for use in displaying on a display device of the user terminal; and
        resetting the elapsed time accumulated by the clock to the defined time responsive to each receipt of one of the plurality of partial authentication responses.

4. The method of claim 1, wherein the retrieving a threshold elapsed time from the memory using the location in the credential string to identify where the threshold elapsed time is stored, comprises:
    retrieving the threshold elapsed time from the memory using the account identifier and the location in the credential string to identify where the threshold elapsed time is stored.

5. The method of claim 1, wherein the determining an elapsed time, the retrieving a threshold elapsed time, and the generating the authentication result are repeated for at least all but one of the characters in the credential string.

6. The method of claim 1, wherein for one of the characters at a first location in the credential string, the elapsed time is determined based on timing between communicating a prompt to enter the credential string for display on the user terminal to the user and an event indicating user entry of the character at the first location in the credential string.

7. The method of claim 1, wherein the determining an elapsed time between user entry of the character at a location in the credential string and user entry of another character at another location in the credential string, using content of the authentication query messaging, comprises:
   determining the elapsed time based on content of the authentication query messaging received through the network interface from the user terminal.

8. The method of claim 1, wherein the retrieving a threshold elapsed time from the memory comprises retrieving the threshold elapsed time from the memory using the account identifier to identify where a threshold elapsed time is stored.

9. The method of claim 8, the operations further comprising:
   repeating the receiving, the determining, the retrieving, the generating, and the selectively communicating for each of a plurality of separate instances of the authentication query messaging from the user terminal;
   generating the threshold elapsed time based on the elapsed times from each of the repetitions of the determining; and
   storing the threshold elapsed time in the memory associated with the account identifier.

10. The method of claim 8, the operations further comprising:
   receiving the threshold elapsed time in account registration messaging from the user terminal; and
   storing the threshold elapsed time in the memory at a location identified using the account identifier.

11. A method, comprising:
   performing operations as follows on a user terminal processor:
   receiving characters of a credential string entered by a user through a user interface of a user terminal;
   for each of a plurality of the characters at defined locations in the credential string, determining an elapsed time between user entry of the character at a location in the credential string and user entry of another character at another location in the credential string;
   for each of the defined locations in the credential string, retrieving a threshold elapsed time from the memory using the location in the credential string to identify a location where the threshold elapsed time is stored;
   generating the authentication result based on comparison of the elapsed time that is determined and the threshold elapsed time that is retrieved for each of the plurality of the characters at the defined locations in the credential string; and
   controlling access by the user to information stored in a memory responsive to the authentication result.

12. The method of claim 11, wherein:
   the threshold elapsed time for each of the defined locations in the credential string comprises a threshold elapsed time range.

13. The method of claim 11, the operations further comprising:
   triggering a clock to accumulate the elapsed time from a defined time; and
   for each of a plurality of the characters at defined locations in the credential string,
      displaying on a display device an indication of the elapsed time between user entry of the character at the location in the credential string and user entry of the another character at the another location in the credential string, and
      resetting the elapsed time accumulated by the clock to the defined time responsive to user entry of the another character.

14. The method of claim 11, the operations further comprising:
   receiving an account identifier entered by the user through the user interface of the user terminal,
   wherein the authenticating a combination of the credential string and the elapsed time to generate an authentication result, further comprises:
      retrieving a registered credential string from the memory using the account identifier to identify a location where the registered credential string is stored; and
      generating the authentication result based on comparison of the registered credential string and the credential string, and based on comparison of the elapsed time that is determined and the threshold elapsed time that is retrieved for each of the plurality of the characters at the defined locations in the credential string.

15. The method of claim 11, wherein the determining an elapsed time between user entry of the character at a location in the credential string and user entry of another character at another location in the credential string, using content of the authentication query messaging, further comprises:
   determining the elapsed time based on timing between displaying on a display device a prompt for the user to enter the credential string and an event indicating user entry of the character at the defined location in the credential string.

16. The method of claim 15, the operations further comprising:
   displaying on the display device an indication of timing since the prompt was displayed on the display device.

17. The method of claim 16, the operations further comprising:
   receiving an account identifier entered by the user through the user interface of the user terminal,
   wherein the authenticating a combination of the credential string and the elapsed time to generate an authentication result, further comprises:
      retrieving a threshold elapsed time from the memory using the account identifier to identify a location where the threshold elapsed time is stored; and
      generating the authentication result based on comparison of the elapsed time and the threshold elapsed time.

18. The method of claim 11, wherein retrieving the threshold elapsed time comprises:
   receiving an account identifier entered by the user through the user interface of the user terminal;
   communicating an authentication query message containing the account identifier through a network interface toward to an account server; and
   receiving an authentication response message containing the threshold elapsed time through the network interface from the account server.

19. A user terminal comprising:
   a user interface;
   a processor; and
   a memory coupled to the processor and storing computer readable program code that when executed by the processor causes the processor to perform operations comprising:
      receiving characters of a credential string entered by a user through a user interface;
      for each of a plurality of the characters at defined locations in the credential string, determining an elapsed time between user entry of the character at a location in the credential string and user entry of another character at another location in the credential string;

for each of the defined locations in the credential string, retrieving a threshold elapsed time from the memory using the location in the credential string to identify a location where the threshold elapsed time is stored;

generating the authentication result based on comparison of the elapsed time that is determined and the threshold elapsed time that is retrieved for each of the plurality of the characters at the defined locations in the credential string; and controlling access by the user to information stored in the memory responsive to the authentication result.

20. The method of claim 1, wherein the determining an elapsed time, the retrieving a threshold elapsed time, and the generating the authentication result are repeated for at least two of the characters in the credential string.

21. The method of claim 1, wherein the threshold elapsed time for at least one defined location of the defined locations in the credential string is different from the threshold elapsed time for at least one other defined location of the defined locations in the credential string.

22. The method of claim 2, wherein the threshold elapsed time range for each of the defined locations in the credential string comprises a minimum threshold elapsed time and a maximum threshold elapsed time.

23. The method of claim 2, wherein the threshold elapsed time range for each of the defined locations in the credential string comprises a first defined threshold elapsed time plus or minus a second defined elapsed time smaller than the first defined threshold elapsed time.

24. The method of claim 11, wherein the determining an elapsed time, the retrieving a threshold elapsed time, and the generating the authentication result are repeated for at least all but one of the characters in the credential string.

25. The user terminal of claim 19, wherein the threshold elapsed time for each of the defined locations in the credential string comprises a threshold elapsed time range.

26. The method of claim 19, wherein the processor is further configured to repeat the determining an elapsed time, the retrieving a threshold elapsed time, and the generating the authentication result, for at least all but one of the characters in the credential string.

* * * * *